United States Patent [19]

Chen et al.

[11] 3,898,959

[45] Aug. 12, 1975

[54] PROCESS FOR THE GROWTH OF HYDROCARBON-CONSUMING MICROORGANISMS

[75] Inventors: Nai Yuen Chen, Titusville; Sundaresa Srinivasan, Princeton Junction, both of N.J.

[73] Assignee: Mobil Oil Corporation, New York, N.Y.

[22] Filed: Jan. 15, 1973

[21] Appl. No.: 323,580

Related U.S. Application Data

[63] Continuation-in-part of Ser. Nos. 58,324, July 27, 1970, abandoned, and Ser. No. 58,736, July 27, 1970, abandoned.

[52] U.S. Cl.............. 195/28 R; 195/109; 195/115; 195/119; 195/142
[51] Int. Cl............................................ C12b 1/00
[58] Field of Search............ 195/28 R, 82, 104, 109, 195/115, 139, 142, 117, 119, 122

[56] References Cited
UNITED STATES PATENTS

| | | | |
|---|---|---|---|
| 2,649,402 | 8/1953 | Murray et al. | 195/51 |
| 3,551,297 | 12/1970 | Hosler | 195/143 |
| 3,594,277 | 7/1971 | Mako | 195/28 R |

*Primary Examiner*—Lionel M. Shapiro
*Assistant Examiner*—R. B. Penland
*Attorney, Agent, or Firm*—Charles A. Huggett; Michael G. Gilman

[57] ABSTRACT

This specification discloses a process for the growth of an aerobic hydrocarbon-consuming microorganism. In the process there is maintained in a fermentation vessel for a predetermined residence time a liquid fermentation broth containing a culture of the microorganism to be grown and, for the growth of the microorganism, a hydrocarbon as a source of carbon, mineral nutrients, and water. Air is injected into the fermentation broth. During the residence time, the fermentation broth is circulated through a bed of charcoal at a rate such that the entire amount of the fermentation broth passes through the bed at least once during the residence time. In a specific embodiment, the air is injected at a rate of 1 to 50 volumes per volume of the fermentation broth per minute, at a dilution ratio of 1.2 to 5, and at a superficial velocity of 200 to 500 meters per hour. The injection of the air provides oxygen for the growth of the microorganism and provides a means for maintaining the fermentation broth at a temperature conducive to the growth of the microorganism.

13 Claims, 1 Drawing Figure

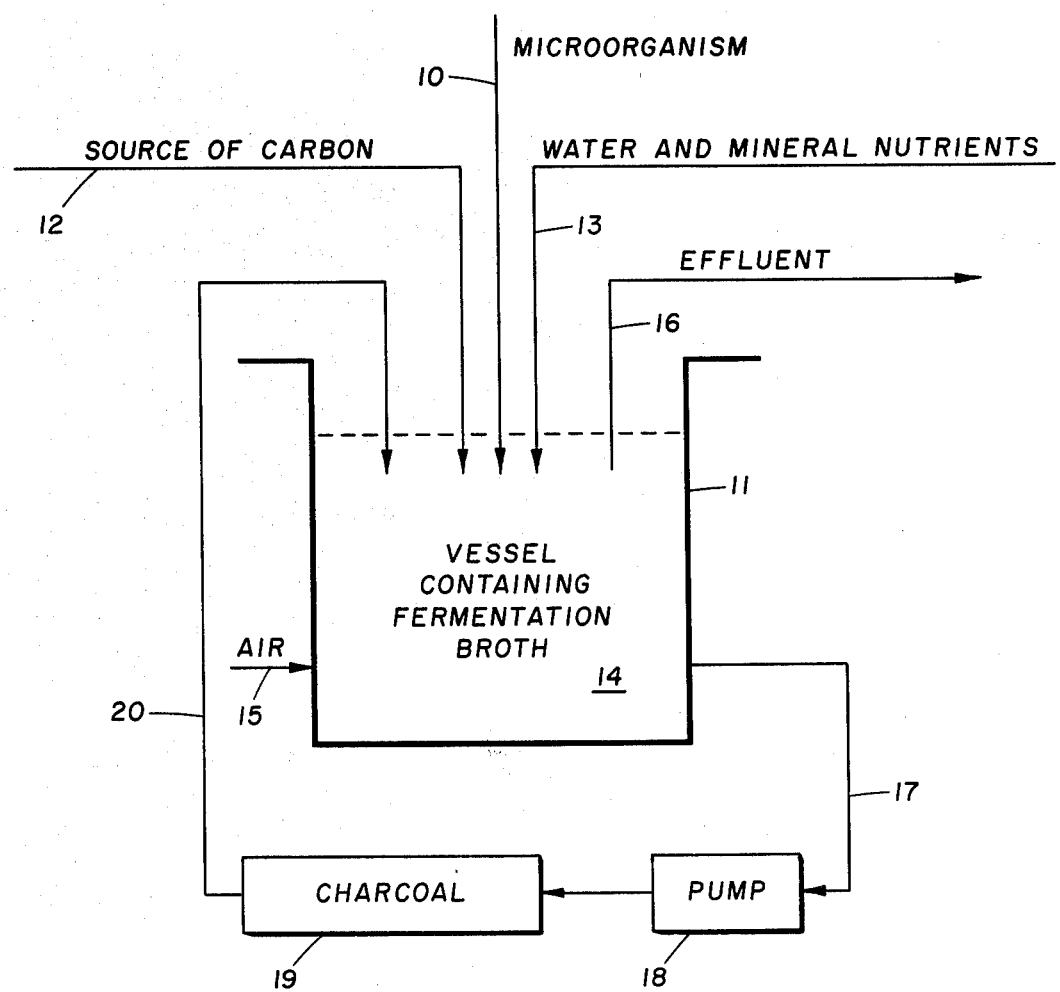

PROCESS FOR THE GROWTH OF HYDROCARBON-CONSUMING MICROORGANISMS

CROSS REFERENCE TO RELATED APPLICATIONS

This application is a continuation-in-part of our copending applications Ser. Nos. 58,324 and 58,736, both filed July 27, 1970 and now abandoned.

BACKGROUND OF THE INVENTION

1. Field of the Invention

This invention relates to the growth of a hydrocarbon-consuming microorganism.

2. Description of the Prior Art

Microorganisms have hitherto been grown in a fermentation broth containing water, mineral nutrients necessary to the growth of the microorganism, and a hydrocarbon substrate, the hydrocarbon serving as a source of carbon for the growth of the microorganisms, by injection of air into the fermentation broth.

Fermentation media have heretofore been contacted with charcoal. In batch fermentation processes, the fermentation broth, after completion of the fermentation, is filtered or otherwise treated to remove the cells of the microorganism employed in the fermentation process. In this application, the term "fermentation broth" will mean the liquid fermentation reaction mixture containing the cells of the microorganism. In these processes, the remainder of the fermentation broth is then treated with charcoal and thereafter employed, after impregnation wtih a culture of microorganism, in another fermentation process. In continuous fermentation processes, the effluent fermentation broth from the fermentation vessel is filtered otherwise treated to remove the cells of the microorganism employed in the fermentation process. The fermentation broth after removal of the cells is then treated with charcoal and returned to the fermentation vessel.

U.S. Pat. No. 3,594,277 discloses fermentation of a hydrocarbon. The fermentation is carried out in a fermenter comprising a normally horizontal cylindrical chamber having closed ends and including a plurality of apertured discs rotatably mounted in the cylinder. There are inlet conduits for biological nutrients and air at one end of the closed cylinder and conduits for removing air, spent nutrients and biological products at the other end of the cylinder. The discs are adapted for continuously rotatably carrying portions of liquid nutrient from the bottom of the cylinder into a gas phase at the top of the cylinder. The gas phase passes through the cylinder in the space within the cylinder above the liquid nutrient. The rotating discs carry with them a portion of the liquid nutrient into the gas phase where the liquid nutrient contacts the gas phase. The patent states that temperature control can be effected by controlling the rate of flow of air.

U.S. Pat. No. 3,219,543 discloses the production of amino acids by the fermentation of hydrocarbons. The fermentation is aerobic and the patent states that sufficient aeration is generally obtained in small flasks by mechanical agitation during the fermentation. The patent also states that, in larger scale operations, the broth is stirred mechanically and sterile air is introduced into the flasks by known methods. Introduction of air is at a rate of ½ to 1 volume of air per minute for each volume of fermentation broth. It is not stated that this air is injected into the fermentation broth.

U.S. Pat. No. 3,404,070 discloses the aerobic production of a microbial product on a meat water and dry blood substrate. It is stated that the product is cultivated by supplying air deeply within a culture layer at a rate of 1.5 to 2.5 parts by volume per hour to 1 volume of nutrient media.

U.S. Pat. No. 2,828,245 discloses the aerobic production of an antibiotic from a substrate containing a soybean product and a carbohydrate such as starch or hydrolytic products of starch. It disclosed that the superficial velocity of the air is between 0.7 and 2 feet per minute. In terms of meters per hour, the superficial velocity is between 12 and 36.5.

U.S. Pat. No. 2,828,246 discloses a process similar to that disclosed in the patent mentioned immediately above. However, it is directed to the production of a different antibiotic. Additionally, the superficial velocities disclosed range between 9.5 and 17.0 units which, presumably as in the patent mentioned immediately above, are in feet per minute. In terms of meters per hour, this range superficial velocity is 173 to 310.

U.S. Pat. No. 3,028,312 discloses a method for cultivating microorganisms on a solid substrate. The substrates disclosed are of vegetable origin such as bran (wheat). The method for cultivating the microorganisms is carried out with the substrate being in the form of a solid or semi-solid culture medium instead of a liquid culture medium. It is stated in the patent that certain materials including charcoal can be used as such or in combination with the vegetative materials mentioned in the patent as substrates to provide supporting substrates for the cultivation of the microorganism.

U.S. Pat. No. 2,649,402 discloses a process for the introduction of oxygen into a steroid molecule. The process is carried out by fermenting, in the presence of oxygen, the steroid by means of a species of fungus of the genus Aspergillus. The fermentation can be carried out in a liquid medium, illustratively brewer's wort, and employing a source of carbon. A hydrocarbon was not disclosed as a source of carbon. It is stated in the patent that suspending or mycelial carriers such as charcoal and activated carbon may be added to facilitate fermentation, aeration and filtration.

U.S. Pat. No. 3,551,297 discloses a fermentation process wherein, during the fermentation, the fermentation broth is contacted with a bed of ion exchange resin. Contact of the fermentation broth with the ion exchange resin is for the purpose of absorbing a fermentation product from the fermentation broth.

U.S. Pat. No. 2,697,062 discloses the growth of yeast on a hydrocarbon substrate.

SUMMARY OF THE INVENTION

In accordance with the invention, there is provided a process for the growth of an aerobic hydrocarbon-consuming microorganism. In the process, a liquid fermentation broth is maintained in a fermentation vessel for a predetermined residence time. This fermentation broth contains a culture of the hydrocarbon-consuming microorganism and also contains, for the growth of the microorganism, a hydrocarbon as a source of carbon, mineral nutrients, and water. Air is injected into the fermentation broth. During the residence time, the fermentation broth is circulated through a bed of charcoal at a rate such that the entire amount of the fermentation broth passes through the bed of charcoal at least once during the residence time. In a specific embodiment, the air is injected at a rate of 1 to 50 volumes of air per volume of the fermentation broth per minute, at a dilution ratio of 1.2 to 5, and at a superficial velocity of 200 to 500 meters per hour. The injection of the air into the fermentation broth provides oxygen for the growth of the microorganism and provides a means for maintaining the fermentation broth at a temperature conducive to the growth of the microorganism.

BRIEF DESCRIPTION OF THE DRAWING

The accompanying FIGURE is a schematic diagram illustrating the process of the invention.

DESCRIPTION OF THE PREFERRED EMBODIMENTS

Our invention is based upon our discovery that circulation of the liquid fermentation broth through a bed of charcoal during the residence time provides improved results with respect to cell productivity, conversion efficiency, and cell protein content.

In a batch fermentation process or operation, a culture of the microorganism, the source of carbon for growth of the microorganism, the mineral nutrients required for the growth of the microorganism, and water are introduced into a fermentation vessel to form the liquid fermentation broth. Thus, referring to the drawing, a culture of a microorganism is introduced through line 10 to fermentation vessel 11. A source of carbon is introduced into the vessel through line 12. Mineral nutrients and water are introduced into the vessel through line 13. If desired, the mineral nutrients and the water may be introduced into the fermentation vessel as separate streams. Within the fermentation vessel, the microorganism, the source of carbon, the mineral nutrients, and the water form the fermentation broth. Air is introduced into the fermentation broth through line 15 continuously throughout the fermentation process. Agitation is provided as a result of the injection of the air. However, in addition, impellers, propellers, stirrers, paddles, or similar devices may be employed to provide agitation. Fermentation in a batch process begins with what is known as the "lag phase". In this phase, the rate of growth of the microorganisms is slow and occurs substantially linearly. The next phase is known as the "exponential phase" and in this phase the growth is rapid and increases exponentially. In the last phase, the rate of growth declines and the density of the microorganisms in the fermentation broth becomes constant, or stationary. At some time approaching the end of the exponential phase or in the last phase, the fermentation reaction is stopped, as by acidification or heating or other conventional means. The desired product, the cells of the microorganism, is then harvested, or recovered, from the fermentation broth. In the batch process, the residence time is the time between the beginning of growth of the microorganism and the time the reaction is stopped. This time is also referred to as the throughput time.

In a continuous fermentation process or operation, the fermentation broth is prepared in the same manner as in a batch process. Agitation is provided similarly as in a batch process. The broth is permitted to go through the lag phase and to enter the exponential phase. At some point in the exponential phase, the process is converted to a continuous process. This point is not necessarily the highest point in the exponential phase but is desirably as high as possible. Conversion to the continuous process is effected by withdrawing effluent continuously from the fermentation vessel through line 16 and introducing the source of carbon, and water and mineral nutrients continuously into the broth. The rate at which the effluent stream in line 16 is withdrawn is equal to the rate at which the source of carbon, and water and mineral nutrients are introduced through lines 12 and 13, less any loss due to evaporation or formation of carbon dioxide, whereby the volume of the fermentation broth 14 within the fermentation vessel is maintained constant. The volume of the fermentation broth divided by the rate of effluent withdrawal, or by the rate of addition of source of carbon, and water and mineral nutrients less losses during fermentation, in volumes per unit time, is the residence or throughput time.

With respect to the residence time in a continuous process, it is ordinarily selected such that the productivity of desired product is as high as possible in terms of weight of product per volume of fermentation vessel per unit time.

Referring again to the FIGURE, the fermentation broth is withdrawn from the fermentation vessel through line 17 containing pump 18 and pumped through chamber 19 containing a bed of charcoal. The fermentation broth is then returned to the fermentation vessel 11 through line 20. In both the batch and continuous processes, the fermentation broth is pumped through the chamber 19 at a rate such that the entire volume of the fermentation broth passes through the chamber at least once within the residence time of the broth in the fermentation vessel. Thus, assuming that the volume of the fermentation broth is A volumes and the residence time is B hours, the fermentation broth will be pumped through the chamber 19 at a rate at least as great as A/B unit volumes per hour. However, if desired, the entire amount of the fermentation broth may be passed more than once during the residence time. Accordingly, the rate of circulation of the fermentation broth through the chamber may be greater than A/B unit volumes per hour. There is no upper limit to the number of times the fermentation broth may be passed through the bed of charcoal during the residence time. However, passage of the fermentation broth through the bed of charcoal more than 10 times during the residence time may be unnecessary.

The charcoal employed in the process of the invention may be any type of animal or vegetable charcoal. The charcoal is an amorphous carbon and is obtained by the incomplete combustion of animal or vegetable matter such as blood, bones, wood, nut shells, or fruit stones. Preferably, charcoal obtained by the incomplete combustion of wood is employed. More preferably, charcoal obtained by the incomplete combustion of hard wood is employed.

The charcoal is employed in any suitable particle size. However, the charcoal particles should be sufficiently large to avoid filtration of the cells of the microorganism from the fermentation broth. They should also be sufficiently large to avoid undesirably high pressure drops. Preferably, the charcoal should be employed in a particle size not smaller than 10 mesh. With respect to mesh size, the sizes in the U.S. Standard Sieve Series are meant. Ordinarily, the charcoal is employed in a size between 4 and 8 mesh.

The amount of charcoal employed should be at least 1 gram for each liter of fermentation broth each 24 hours. Preferably, greater amounts of charcoal, for example 5 grams for each liter of fermentation broth each 24 hours, are employed. Thus, amounts of charcoal of 10 grams or more for each liter of fermentation broth each 24 hours may be employed.

In procedures for the growth of microorganisms, air is injected into the liquid fermentation broth. The oxygen in the air is transported into the liquid fermentation broth, specifically into the aqueous portion of the liquid fermentation broth. The oxygen is consumed by the microorganism and consumption of the oxygen by the microorganism, and growth of the microorganism, is an exothermic operation resulting in heat being generated in, and imparted to, the fermentation broth. The amount of heat imparted to the fermentation broth ordinarily results in a rise of temperature beyond an acceptable value. Cooling of the fermentation broth to a certain extent occurs as a result of the injection of the air, but often additional cooling is required, with consequent increase in operating cost, to bring the temperature of the fermentation broth to an acceptable value. The cost of injecting the air is a significant part of the cost incurred in the production of the microorganism product and reduction in the cost of gas injection results in significant reductions in the cost of the microorganism product.

In a specific embodiment of our invention, effective temperature maintenance, minimized energy requirements, and consequent minimized costs, of injecting the air, and satisfactory concentrations of oxygen in the aqueous phase of the fermentation broth are obtained by injecting the air at rates, dilution ratios, and superficial velocities within critical values. Thus, by injecting the air into the liquid fermentation broth at a rate of 1 to 50 volumes of air per volume of fermentation broth per minute, effective temperature control of the fermentation broth can be obtained normally without the necessity for additional cooling. However, with the lower rates of air injection, some additional cooling may sometimes be required. Moreover, by injecting the air at a dilution ratio of 1.2 to 5, energy consumption and cost of injecting the air are minimized. Additionally, by injecting the air at a superficial velocity of 200 to 500 meters per hour, an adequate concentration of oxygen is maintained in the aqueous phase of the fermentation broth.

Injection of the air under the conditions mentioned above can provide the sole means for effecting temperature maintenance. As a result, a significant advantage is obtained. In procedures where cooling additional to that obtained by injection of the air is effected by means of cooling coils and a refrigerant, for example, a significant temperature difference may exist between the fermentation broth and the surface of the cooling coil. With significant temperature differences, the microorganisms in the fermentation broth are subject to thermal shock. The microorganisms subject to thermal shock may be killed or, at the least, have their growth rates reduced. Where the evaporative cooling effect of the injected air provides the sole means for temperature maintenance, temperature differentials within the fermentation broth are minimized with consequent minimal thermal shock. Preferably, injection of the air provides 95% of the cooling required to maintain the fermentation broth at the desired temperature.

In the process of the invention, the temperatures of the fermentation broth at which the microorganisms are grown may be any temperature heretofore employed. The literature indicates that temperatures conducive to the growth of the microorganisms may range from 15° to 55° C. However, at the upper and lower ends of this range, the rate of growth of the microorganism is minimal. More rapid rates of growth are obtained at temperatures ranging from 25° to 35° C. However, the temperature at which optimal rate of growth is obtained will depend upon, among other factors, the particular microorganism being grown. The temperature employed should provide a rate of growth of at least 0.7 gram of microorganism, on a dry basis, per liter of fermentation broth per hour. This temperature for any particular microorganism can be determined by experimentation. However, to achieve this rate of growth, the temperature for many microorganisms cannot exceed about 35° C.

The air is injected into the fermentation broth by any conventional means for injecting a gas phase into a liquid phase. For example, the air may be injected into the fermentation broth by means of spargers. Spargers having diameters between 3 and 24 inches are satisfactory. Fritted bubblers, such as fritted glass bubblers, may also be employed. Preferably, the air is injected into the fermentation broth at the lowermost point in the fermentation broth. The air may be injected into the fermentation broth at a right angle to the surface of the fermentation broth. In this case, the air will flow upwardly through the fermentation broth perpendicularly to the surface thereof, escaping from the fermentation broth as it reaches the surface. The air may also, for example, be injected into the fermentation broth in a direction parallel to the surface of the fermentation broth. In this case, and in other cases where the air is injected into the fermentation broth at an angle other than a right angle to the surface of the fermentation broth, the injected air will, upon entering the fermentation broth, immediately begin to change its direction of flow to a direction perpendicular to the surface of the fermentation broth, and escape from the fermentation broth at the surface.

In its passage through the fermentation broth, the injected air will move along with it, although at a lesser rate, a portion of the fermentation broth. Thus, a portion of the fermentation broth is moved upwardly with injection of the air. Concomitantly, the remainder of the fermentation broth will move downwardly to replace the portion moving upwardly. Thus, injection of the air results in a circulation of the fermentation broth with a portion being in an upcoming zone and the remainder being in a downcoming zone.

As mentioned, the air is injected into the fermentation broth at a rate of 1 to 50 volumes of air per volume of fermentation broth per minute. Preferably, the air is injected into the fermentation broth at a rate of 5 to 10 volumes of air per volume of fermentation broth per minute.

The dilution ratio employed, as also previously mentioned, is 1.2 to 5. By "dilution ratio" is meant the ratio of the total volume of the fermentation broth to the volume of the portion of the fermentation broth through which the air passes from its point of injection to its point of escape at the surface of the fermentation broth. For example, assume that the fermentation broth is contained in a cylindrical vessel having a diameter of 3 feet and the depth of the fermentation broth therein is 10 feet. The volume of the fermentation broth will therefore be 70.69 cubic feet. Also assume that the air is injected into this fermentation broth through a circular sparger having a diameter of 1.5 feet and positioned horizontally at the very bottom of the vessel. The air entering the fermentation broth from this sparger will flow upwardly from the bottom of the vessel to the surface of the fermentation broth in a column having essentially the diameter of the sparger; namely, 1.5 feet, and a length equal to the depth of the fermentation broth; namely, 10 feet. The volume of the portion of the fermentation broth through which the air passes will, therefore, be 17.67 cubic feet and the dilution ratio will be 4.6.

With respect to the dilution ratio, it was previously indicated that injection of the air into the fermentation broth results in circulation of the fermentation broth with a portion of the fermentation broth being in an upcoming zone and the remainder being in a downcoming zone. It will be seen that the dilution ratio defined above is equivalent to the ratio of the volume of the fermentation broth to the volume of the upcoming zone. Stated in another manner, the dilution ratio is equivalent to the ratio of the sum of the volumes of the upcoming and downcoming zones to the volume of the upcoming zone.

Further, with respect to the dilution ratio, the volume of the portion of the fermentation broth through which the air passes will be the product of the average area and the length of this portion. By "average area" is meant the average of the areas of the volume of the fermentation broth at the point of introduction of the air and at the surface of the fermentation broth where the air escapes. The length of the volume of the portion of the fermentation broth through which the air passes need not be substantially a direct path from the point of introduction of the air and the surface of the fermentation broth. Rather, the direction of the path of the air from its point of introduction to its point of escape from the surface of the fermentation broth can be changed one or more times by baffles or by other means. By changing the direction of the path of the air, the length of the path can be increased. Thus, by the use of baffles or other means, the length of the volume of the portion of the fermentation broth through which the air passes can be increased with the result that the volume is also increased. Accordingly, for any given area of the volume of the fermentation broth at the point of introduction of the air and for any given length of substantially direct path from the point of introduction, the dilution ratio can be decreased by increasing the length of the path of flow of the air.

The superficial velocity, as also previously indicated, will be between 200 and 500 meters per hour. By "superficial velocity" is meant the ratio of the rate of injection of the air, in volumes per unit time, to the average cross-sectional area of the fermentation broth. Assuming, for example, injection of the air at the rate of 200 cubic meters per hour and assuming that the average cross-sectional area of the fermentation broth is 1 square meter, the superficial velocity will be 200 meters per hour. By "average cross-sectional area" of the fermentation broth is meant the average of the cross-sectional areas of the fermentation broth at the point of injection of the air and at its surface.

Any aerobic, hydrocarbon-utilizing species of bacteria, fungi, yeasts, and molds can be grown by the process of the invention. Non-fastidious organisms are preferred, i.e., those that will grow in simplified salts media without necessity for addition of organic compounds. The microbial cells are utilizable as a protein feed for animals, and even humans.

With respect to bacteria employed, suitable genera include Pseudomonas, Bacillus, Flavobacterium and Sarcina. Illustrative species of these genera are *P. aeruginosa, P. oleovorans, P. putida, P. boreopolis, P. methanica, P. fluorescens, P. pyocyanea, B. aureus, B. acidi, B. subtillis, B. urica, B. cereus, B. coagulans, B. mycoides, B. circulans, B. megaterium, Flavobacterium aquatile, Sarcina alba,* and *Sarcina luteum.* Other preferred genera are Achromobacter and Nocardia, as illustrated by species such as *A. xerosis, A. agile, A. gutatus, A. superficialis, A. parvulus, A. cycloclastes, N. salmonicolor, N. asteroides, N. minimus, N. opaca, N. corollina, N. rubra,* and *H. paraffinae.* The genus Mycobacterium is useful, particularly such species as *M. paraffinicum, M. phlei, M. lacticola, M. rhodochrous, M. smegmatis, M. rubrum, M. luteum, M. album,* and *M. byalinicum.*

Still other hydrocarbon-utilizing bacteria are *Methanomonas methanica, Methanomonas sp.,* Micrococcus *paraffinae, B. aliphaticum, B. hidium, B. benzoli,* and species of Micromonospora. Other useful genera include Brevibacterium, Aerobacter, and Corynebacterium.

Of the fungi, there may be employed any fungus within the classification Eumycetes or true fungi, but preferably those from the classification Fungi Imperfecti or from the classification Phycomycetes. Preferred fungi from the class Fungi Imperfecti are species of the genera Aspergillus and Penicillium, as illustrated by *A. niger, A. glaucus, A. oryzae, A. flavus, A. terreus, A. itaconicus, P. notatum, P. chrysogenum, P. glaucum, P. griseofulvum, P. expansum, P. digitatum* and *P. italicum.* Other suitable organisms include various species of the genera Monilia, Helminthosporium, Alternaria, Fusarium, and Myrothecium. Preferred fungi of the class Phycomycetes include species from the genera Rhizopus and Mucor, such as *R. nigrificans, R. oryzae, R. delemar, R. arrhizus, R. stolonifer, R. sp., M. mucedo,* and *M. genevensis.*

Some of the foregoing genera of fungi are also characterized as molds, such as Aspergillus, Penicillium, Rhizopus, and Mucor, but it will be understood that all are true fungi or Eumycetes.

Of the yeasts, the preferred organisms are of the family Cryptococcaccae, and, particularly, of the subfamily Cryptococcoidae. Preferred genera are Pichia, Torulopsis (or Turola), and Candida. Preferred species are *Pichia polymorpha, Candida lipolytica, Candida pulcherrima, Candida utilis, Candida utilis Variati major, Candida tropicalis, Candida intermedia,* and *Torulopsis colliculosa.* Other useful species are *Hansenula anomala, Oidium lactia,* and *Neurospora sitophila.*

The hydrocarbon is one that is in the liquid phase at the temperature of growth of the microorganism so as to be able to form an emulsion with the water in the fermentation broth. Aliphatic hydrocarbons are preferred, and these may be saturated or unsaturated, straight or branched chain, and having up to 20 or 30 or 40 or more carbon atoms. Saturated straight chain hydrocarbons containing 15 or more carbon atoms are particularly desirable. Cyclic hydrocarbons, comprising aromatic and alicyclic compounds, are also of use, including alkyl-substituted cyclic compounds having 1, 2, or more alkyl substituents, each of any suitable length, chain configuration, and degree of unsaturation, and in which the cyclic moiety is aromatic or cycloparaffinic. Alkyl-substituted aromatic hydrocarbons include toluene, the various xylenes, mesitylene, ethyl benzene, p-cymene, the diethylbenzenes, and the isomeric propylbenzenes, butylbenzenes, amylbenzenes, heptylbenzenes, and octylbenzenes. Among the useful alkyl-substituted cycloparaffins are methylcyclopentane, the di- and trimethylcyclopentanes, ethylcyclopentane, the diethylcyclopentanes, the various propyl-, butyl-, amyl-, hexyl-, and octylcyclopentanes. There may be also used the alkylcyclohexanes, which are substituted in a manner corresponding to the former alkylcyclopentanes, as well as such compounds as the various tetramethylcyclohexanes, methylethylcyclohexanes, methylpropylcyclohexanes, and the like. Crude oils, various petroleum fractions, and residua are also of use.

It will be appreciated that the hydrocarbon may be in the liquid phase not only by having a suitable melting point but also by being dissolved in a suitable solvent. The hydrocarbons contemplated in the preceding paragraphs are those which are normally liquid at temperatures of growth of the microorganisms. However, other useful hydrocarbons are those which are normally gaseous at these temperatures, such as methane, ethane, propane, butane and other $C_3$ to $C_5$ hydrocarbons. These gaseous hydrocarbons may be dissolved in a normally liquid hydrocarbon, such as petroleum fraction in the gasoline or kerosene boiling range, or in an alkane like octane, nonane, or decane or they may be dissolved in any other conventional solvent therefor which is inert in the growth operation and non-toxic to the microorganisms. Also, normally, solid hydrocarbons may be used as the source of carbon by dissolving them in a hydrocarbon solvent, in the manner described, or in any other conventional inert non-toxic solvent.

The mineral nutrients required for the growth of the microorganisms comprise a source of nitrogen such as nitrate or nitrite or ammonium salt or urea, and such ions as potassium, magnesium, phosphate, and sulfate, as well as ions of trace elements like cobalt and molybdenum. Traces of manganese, iron, and calcium may be present. As water is included in the fermentation broth, most of these ions will usually be present in sufficient quantity in ordinary potable water supplies. However, it is desirable to add the ions to the nutrient to ensure their presence in sufficient quantity for growth of the microorganisms.

In a specific procedure for the growth of microorganisms employing the process of the invention, the hydrocarbon substrate is preferably a normal paraffin containing 15 or more carbon atoms. These hydrocarbons have low volatility and their loss with the air escaping from the surface of the fermentation broth is avoided. Suitable hydrocarbon substrates substantially free of branched chain hydrocarbons may be manufactured by processes such as molecular sieve separations or urea adduction, processes which are known in the art. The growth procedure, additionally, is preferably carried out on a commercial scale with continuous withdrawal of product and replenishment of nutrients and the fermentation broth may be in the volume range of 50,000 to 400,000 gallons, for example, 160,000 gallons. The air injection provides, exclusively, cooling. It also preferably provides, exclusively, agitation. Thus, no additional cooling, or mechanical agitation, is provided.

The depth of the fermentation broth is such that the air may be injected at the bottom of the fermentation broth at a pressure in the range of 0.25 to 9, preferably in the range of 0.25 to 2, inches of mercury (gage). The range of 0.5 to 2 inches is below 1 pound per square inch gage (psig) corresponding to about 0.24 to 0.98 psig at 60°F. It has been found that at the pressure range of 0.2 to 9 inches of mercury a distinct and surprising economy is possible in respect of the energy required to carry out the growth operation. At a pressure range of 0.5 to 2 inches of mercury, the energy required to carry out the growth operation is only about 1/15 to ⅓ of that required in a like process but in which agitation is accomplished by means of mechanical agitators or high pressure air, at the same time the same excellent growth characteristics and comparable microbial productivity are obtained. At air pressures of about 6 inches of mercury, the energy requirement is only about ½ of that required in a like process using mechanical agitators or high pressure air. The air is employed in the amount to provide 30 to 70 times the stoichiometric amount of oxygen required for the growth of the microorganisms.

The biomass concentration is maintained at 10 grams of dry cells of the microorganism per liter of fermentation broth.

The microorganisms in the continuously withdrawn product are separated from the residual hydrocarbon, mineral nutrients and water preferably by continuous centrifugation.

The following examples will be further illustrative of the invention.

EXAMPLE 1

Pichia sp. was grown on n-hexadecane in a first set of continuous fermentation processes. In each of these processes, the same conditions of rate of introduction of n-hexadecane, water, and mineral nutrients, rate of removal of effluent, and residence time were maintained.

The following conditions were employed:

| | | |
|---|---|---|
| Temperature | 39°C. | |
| pH | 3.3–3.4 | (Control effected using 7N $NH_4OH$) |
| Volume of fermentation broth | 10 liters | |
| Flow Rates: | | |
| Water and mineral nutrient | 1.2 liters/hour | |
| n-Hexadecane | 39 milliliters/hour | |
| Air | 2.5 cubic feet/minute | |
| Composition of mineral nutrient media (in demineralized water): | | |
| $KH_2PO_4$ | 5 | grams/liter |
| $(NH_4)_2SO_4$ | 2 | " |
| $MgSO_4$ | 4 | " |
| $Na_2MoO_4.2H_2O$ | .002 | " |
| $CoCl_2.6H_2O$ | .002 | " |
| $MnSO_4.H_2O$ | .002 | " |
| $CaCl_2$ | .02 | " |
| $FeSO_4.7H_2O$ | .01 | " |
| $Na_2CO_3$ | .1 | " |
| $H_2SO_4$ | To adjust pH to 3.2 | |

The cell productivity, conversion efficiency, and protein content of the cells under steady-state conditions were measured.

A similar set of continuous fermentation processes, in which the conditions were the same as in the first set of processes, were also carried out. However, in this latter set of processes, the fermentation broth, during the residence period, was circulated through a bed of wood charcoal. The bed contained 150 grams of charcoal having a particle size of −4+6 mesh (U.S. Standard Sieve Series) and the rate of flow of the fermentation broth through the bed was 4 liters per minute. Following each process, the cell productivity, conversion efficiency, and protein content of the Pichia cells under steady-state conditions were measured. In the table, cell productivity is given in grams of Pichia cells per liter of fermentation broth per hour, conversion efficiency is given in grams of Pichia cells per gram of n-hexadecane, and cell protein content is given in weight percent of protein, estimated by elemental nitrogen analysis, with use of the formula: % protein content = % Nitrogen × 6.25.

TABLE I

|  | WITHOUT CHARCOAL | WITH CHARCOAL |
|---|---|---|
| Cell Productivity | 0.35 – 0.45 | 1.6 – 1.7 |
| Conversion Efficiency | 0.3 – 0.7 | 0.9 – 1.1 |
| Protein Content | 40 – 50 | 55 – 65 |

It will be seen from the table that marked increases in cell productivity, conversion efficiency, and protein content were obtained employing the process of the invention.

EXAMPLE 2

*Candida lipolytica* was grown by a continuous fermentation process in a fermenter on n-hexadecane under steady-state conditions, the temperature being 36°C., for a period of 5 days. At the end of this period, a second period of 5 days of growth under the same steady-state conditions was begun. During this second period, however, a foraminous container holding charcoal was maintained in the fermentation broth in the fermenter. For each of the periods of 5 days, the cell productivity, protein content of the cells, and the cell concentration, i.e., the weight of cells per unit volume of fermentation broth, were measured. The results are given in Table II. The cell productivity and protein content are given in the same units as Table I. Cell concentration is given in grams of cells per liter of fermentation broth.

TABLE II

|  | WITHOUT CHARCOAL | WITH CHARCOAL |
|---|---|---|
| Cell Productivity | 0.2 – 0.3 | 0.8 – 0.9 |
| Protein Content | 40 | 55 |
| Cell Concentration | 2.5 | 10 |

It will be seen from Table II that marked increases in cell productivity, protein content, and cell concentration were obtained employing the process of the invention.

EXAMPLE 3

Pichia sp. was grown continuously in a fermentation vessel on an n-hexadecane substrate. The fermentation broth was maintained at a volume of 10 liters and had the same composition as to water and mineral nutrients as in Example 1. The fermentation broth during the growth operation was continuously circulated through a bed of charcoal at a rate of 9 liters per minute and air was injected at a rate of 70 liters per minute. The temperature of the fermentation broth at the beginning of the growth operation was 38°C. and over a period of 44 days was gradually increased to 43°C. The following table gives the days on stream, the temperature of the fermentation broth, the effluent rate, and the cell productivity, i.e., rate of growth. The breaks in the days on stream indicate weekends and one other day when no data was taken. The effluent rate is indicative of the residence time, the residence time being the reciprocal of the volume of the fermentation broth (10 liters) and the effluent rate.

TABLE III

| Days on Stream | Temp. °C. | Effluent Rate — Liter/Hour | Cell Productivity — Grams of Dry Cells/Liter/Hour |
|---|---|---|---|
| 0 | 38.0 | 0.99 | 0.22 |
| 1 | 38.1 | 0.95 | 1.02 |
| 2 | 38.7 | 0.93 | 0.87 |
| 3 | 39.0 | 0.94 | 0.78 |
| 4 | 39.2 | 0.91 | 0.83 |
| 7 | 38.9 | 0.91 | 0.80 |
| 8 | 38.8 | 0.92 | 0.87 |
| 9 | 38.8 | 0.95 | 0.93 |
| 10 | 39.8 | 0.94 | 0.79 |
| 11 | 39.9 | 0.94 | 0.90 |
| 14 | 39.9 | 0.95 | 0.91 |
| 15 | 39.9 | 0.94 | 0.88 |
| 16 | 39.9 | 0.91 | 0.84 |
| 17 | 40.0 | 0.89 | 0.88 |
| 18 | 40.9 | 0.90 | 0.87 |
| 21 | 40.8 | 0.90 | 1.37 |
| 22 | 41.0 | 0.95 | 1.00 |
| 23 | 41.0 | 0.85 | 0.83 |
| 24 | 41.0 | 0.87 | 0.91 |
| 25 | 40.9 | 0.89 | 0.96 |
| 28 | 40.8 | 0.91 | 0.94 |
| 29 | 40.9 | 0.92 | 0.96 |
| 30 | 41.0 | 0.90 | 0.94 |
| 31 | 41.0 | 0.90 | 0.95 |
| 32 | 41.1 | 0.90 | 1.03 |
| 35 | 40.1 | 0.89 | 0.92 |
| 36 | 41.4 | 0.89 | 0.95 |
| 37 | 41.4 | 0.90 | 0.91 |
| 38 | 42.0 | 0.91 | 0.89 |
| 39 | 42.0 | 0.90 | 0.93 |
| 41 | 42.0 | 0.92 | 0.96 |
| 43 | 43.0 | 0.90 | 0.92 |
| 44 | 43.0 | 0.90 | 1.05 |

It will be observed from the table that, at the beginning of the growth operation, the rate of growth was 0.22 gram per liter per hour (g/l/h). However, this increased to 1.02 g/l/h on the first day. The rate of growth as the temperature was increased varied thereafter from 0.78 to 1.37 g/l/h but after the 24th day did not go below 0.9 g/l/h. At the 44th day, with the temperature at 43.0°C., the rate of growth was 1.05 g/l/h.

We claim:

1. A process for the growth of an aerobic, hydrocarbon-consuming microorganism comprising:
   a. maintaining in a fermentation vessel for a predetermined residence time a liquid fermentation broth containing a culture of said hydrocarbon-consuming microorganism and, for the growth of said hydrocarbon-consuming microorganism, a hydrocarbon as a source of carbon, mineral nutrients, and water,
   b. injecting air into said fermentation broth at a rate of 1 to 50 volumes per volume of said fermentation broth per minute, at a dilution ratio of 1.2 to 5, and at a superficial velocity of 200 to 500 meters per hour.

c. maintaining said fermentation broth at a temperature conducive to the growth of said microorganism solely by injection of said air into said fermentation broth, and d. during growth of said microorganism circulating said fermentation broth through a bed of charcoal at a rate such that the entire amount of said fermentation broth passes through said bed of charcoal within said residence time, said bed of charcoal being in the form of particles of charcoal sufficiently large to avoid filtration of the cells of said microorganism from said fermentation broth.

2. The process of claim 1 wherein said air is injected into said fermentation broth at a rate of 5 to 10 volumes per volume of said fermentation broth per minute.

3. The process of claim 1 wherein said injection of said air provides 95% of the cooling required to maintain said fermentation broth at said temperature conducive to the growth of said microorganism.

4. The process of claim 1 wherein said injection of said air is the sole means for maintaining said fermentation broth at a temperature conducive to the growth of said microorganism.

5. The process of claim 1 wherein said microorganism is grown in a batch fermentation operation.

6. The process of claim 1 wherein said microorganism is grown in a continuous fermentation operation.

7. The process of claim 1 wherein said microorganism is Pichia sp.

8. The process of claim 1 wherein said microorganism is *Candida lipolytica*.

9. The process of claim 1 wherein the depth of said fermentation broth is such that said air can be injected at the bottom of said fermentation broth at a pressure between 0.25 and 9 inches of mercury (gage).

10. The process of claim 9 wherein the depth of said fermentation broth is such that said air can be injected at a pressure between 0.25 and 2 inches of mercury (gage).

11. The process of claim 6 wherein the biomass concentration is maintained in said fermentation broth at 10 grams of the dry cells per liter of fermentation broth.

12. The process of claim 1 wherein said particles of charcoal are of a size not smaller than 10 mesh.

13. The process of claim 1 wherein said particles of charcoal are of a size between 4 and 8 mesh.

* * * * *